March 6, 1945. F. A. REECE 2,370,753
COURSE INTERSECTION FINDER
Filed Nov. 19, 1943 6 Sheets-Sheet 2
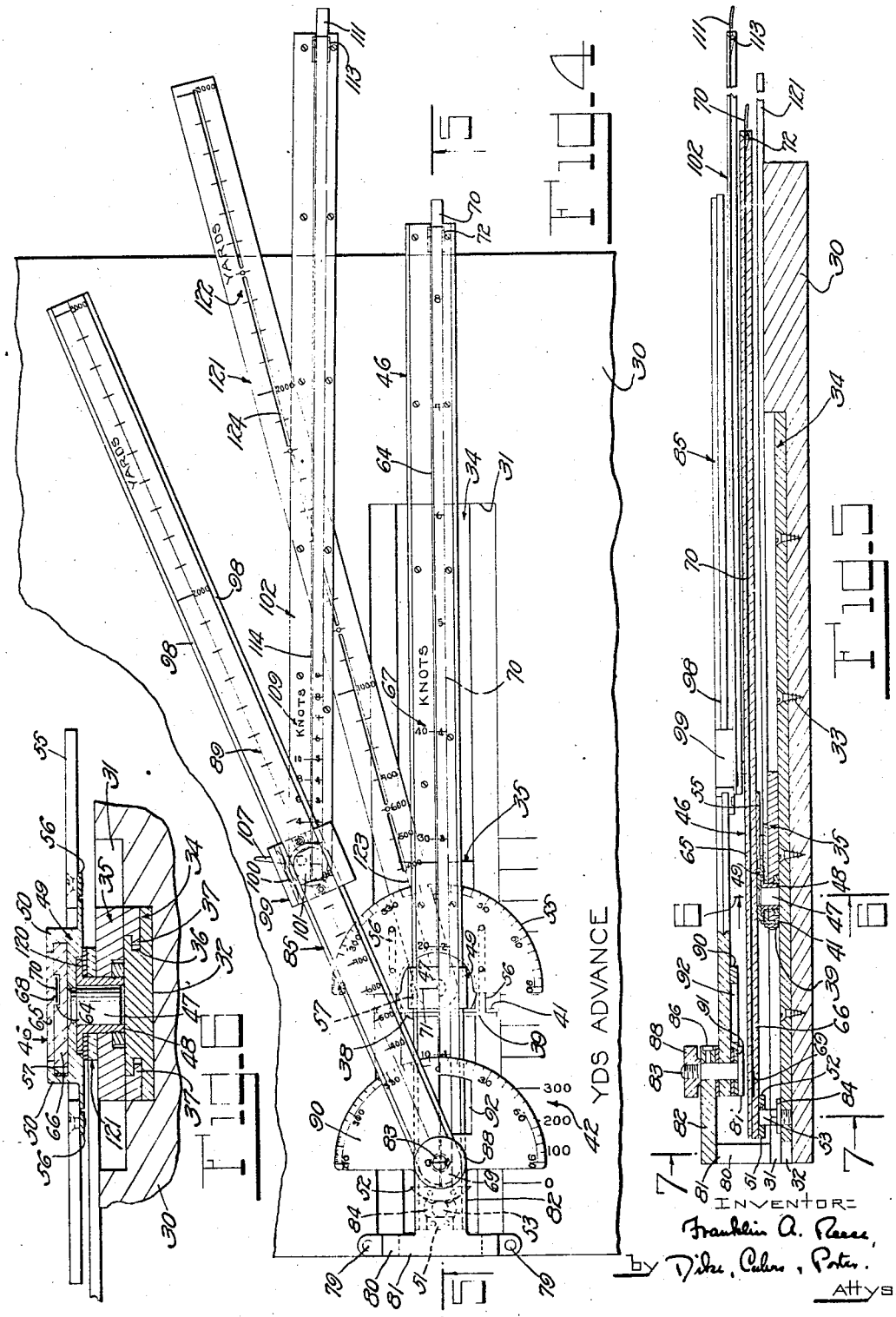

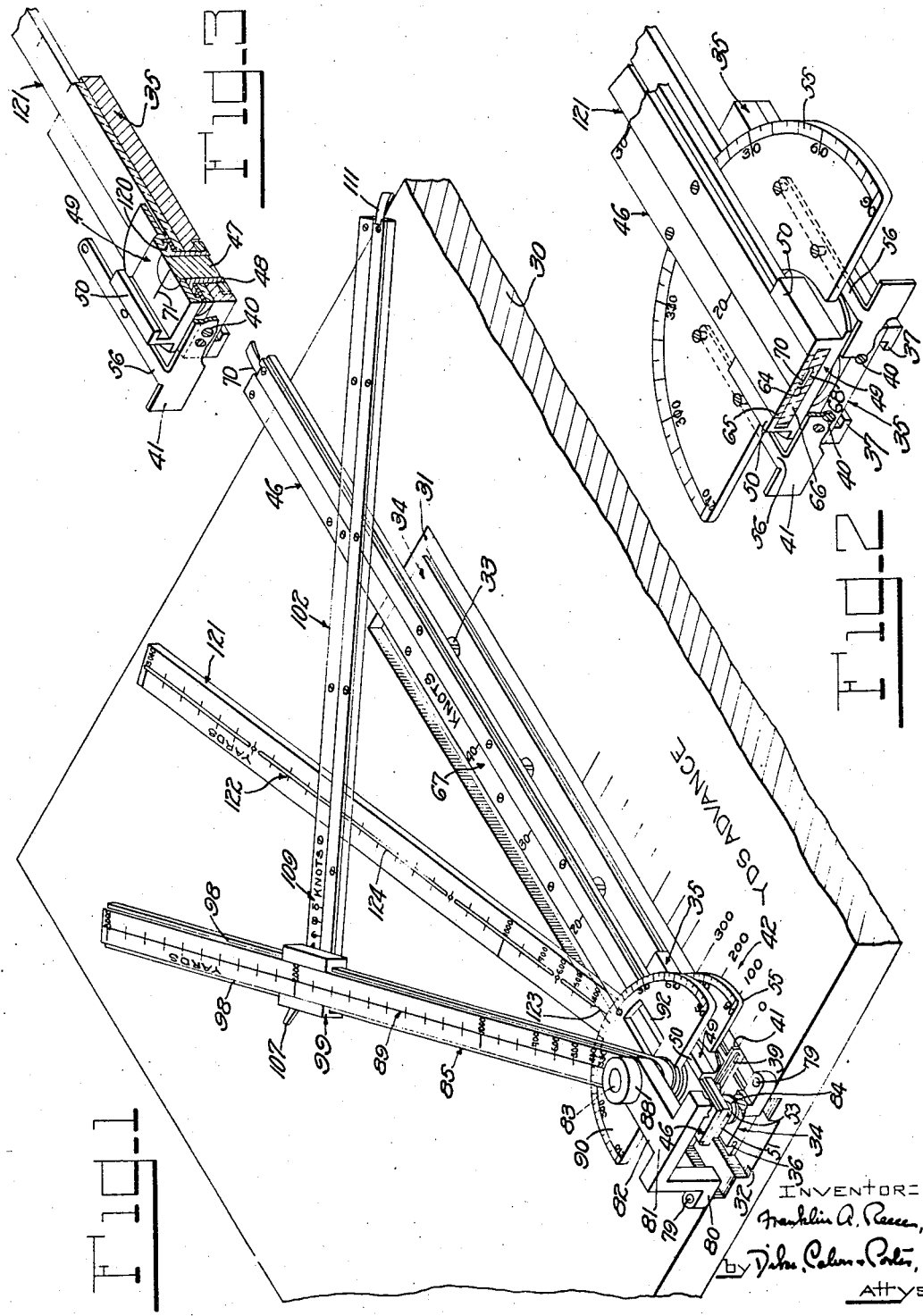

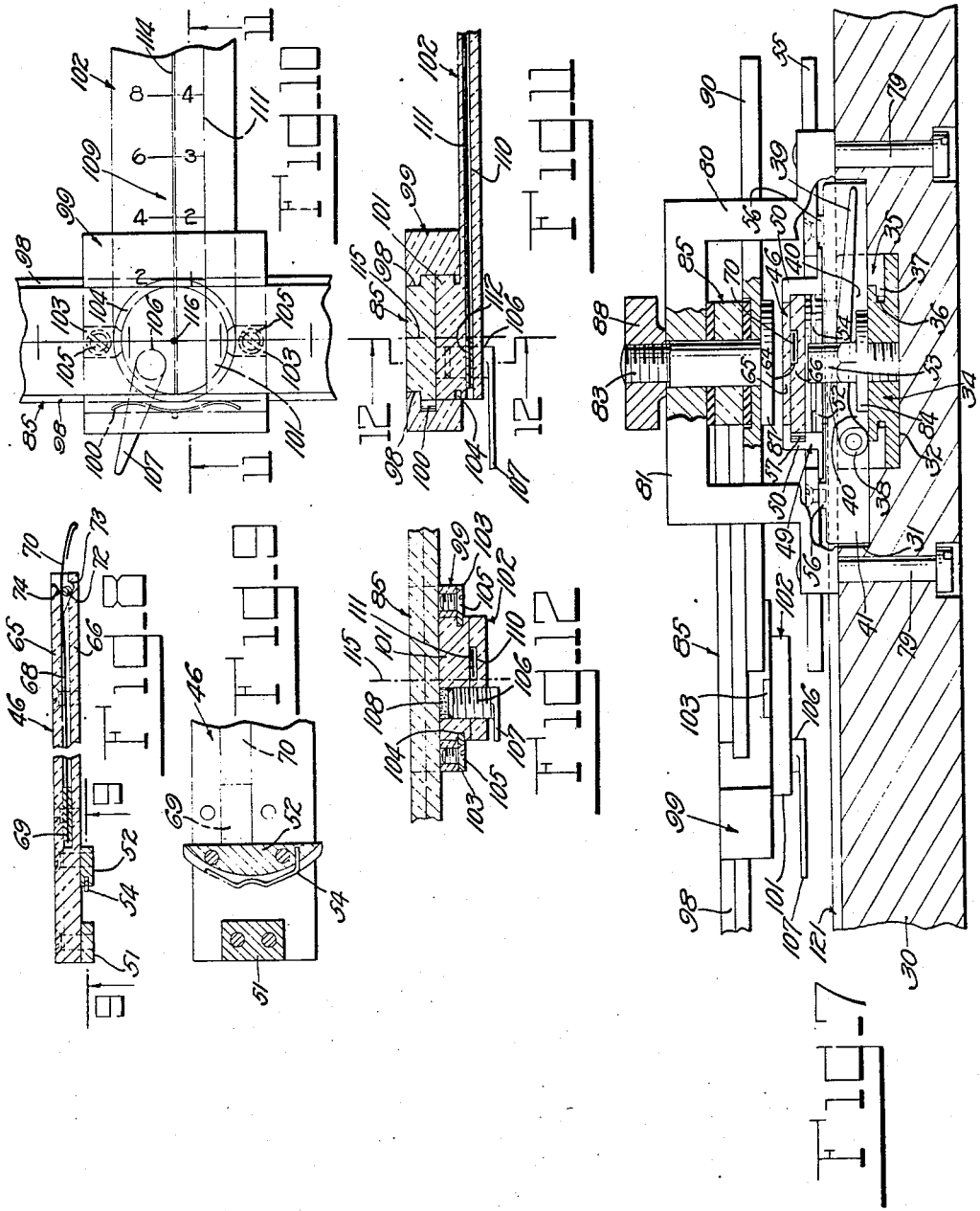

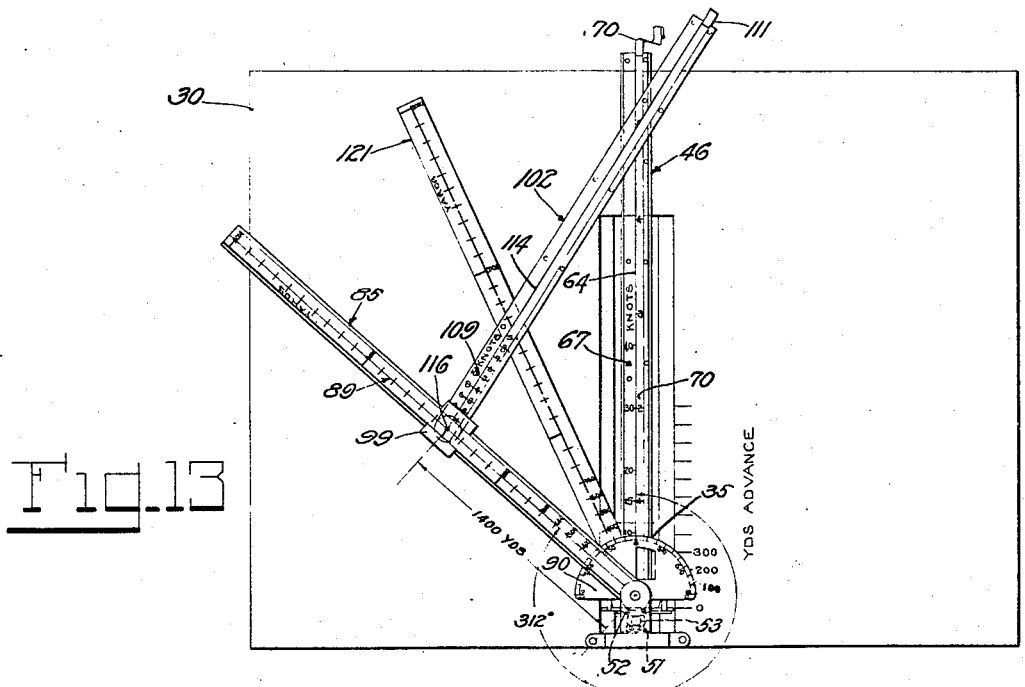
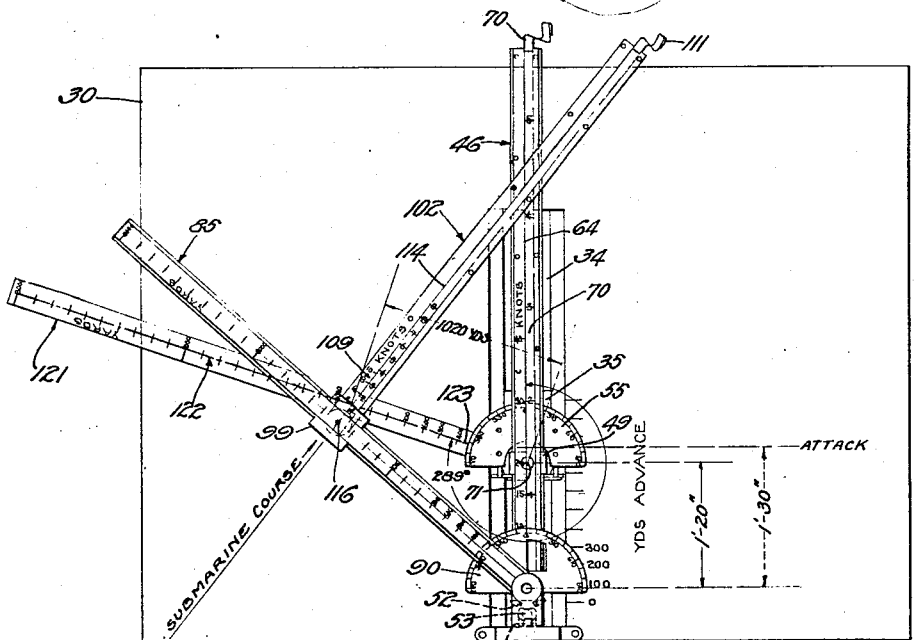

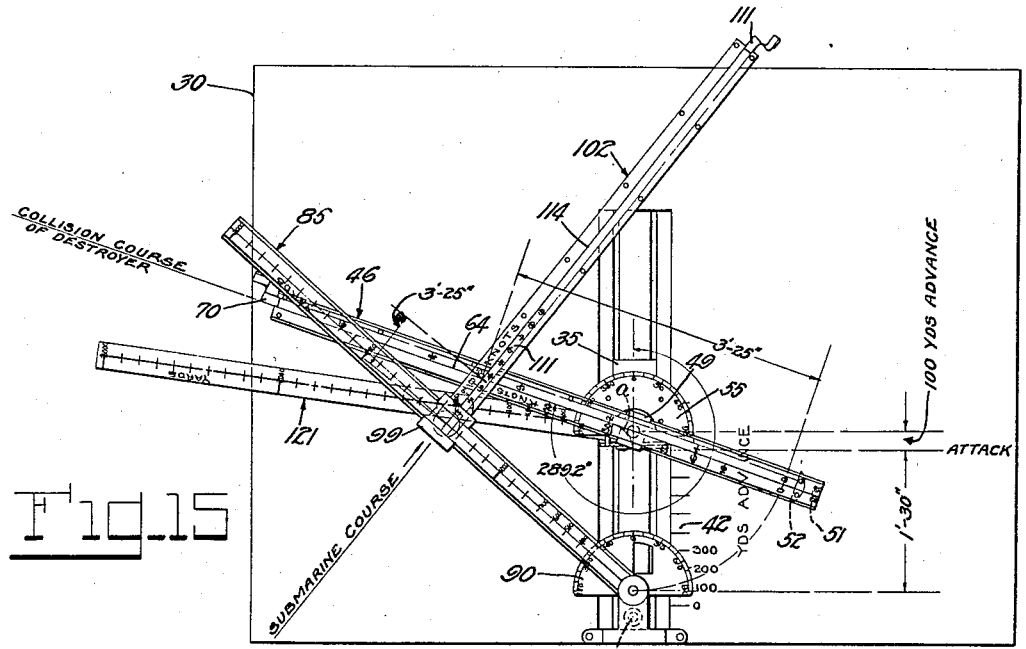
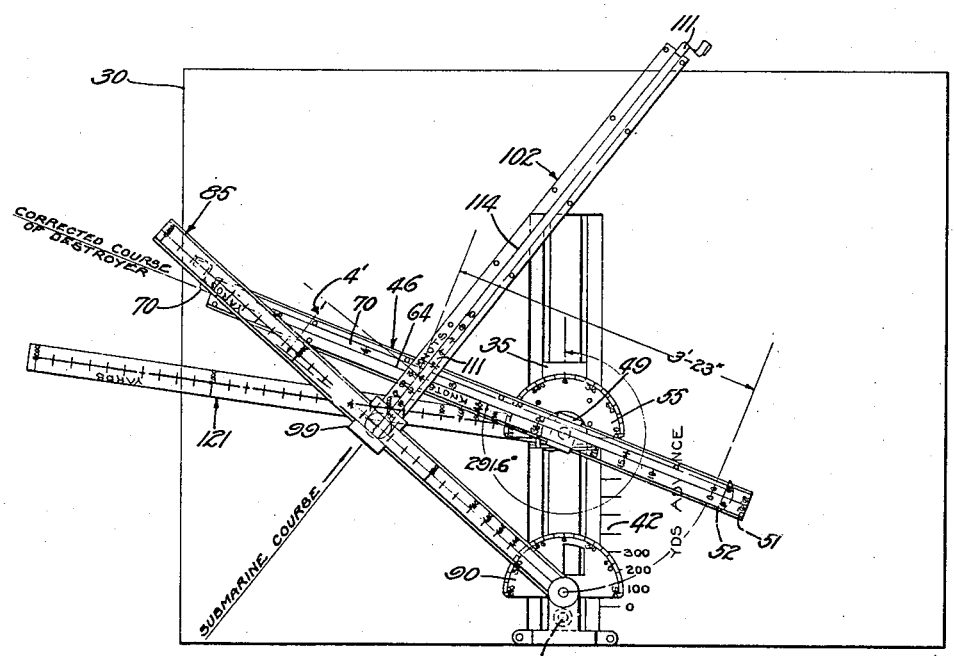

March 6, 1945.   F. A. REECE   2,370,753
COURSE INTERSECTION FINDER
Filed Nov. 19, 1943   6 Sheets-Sheet 6
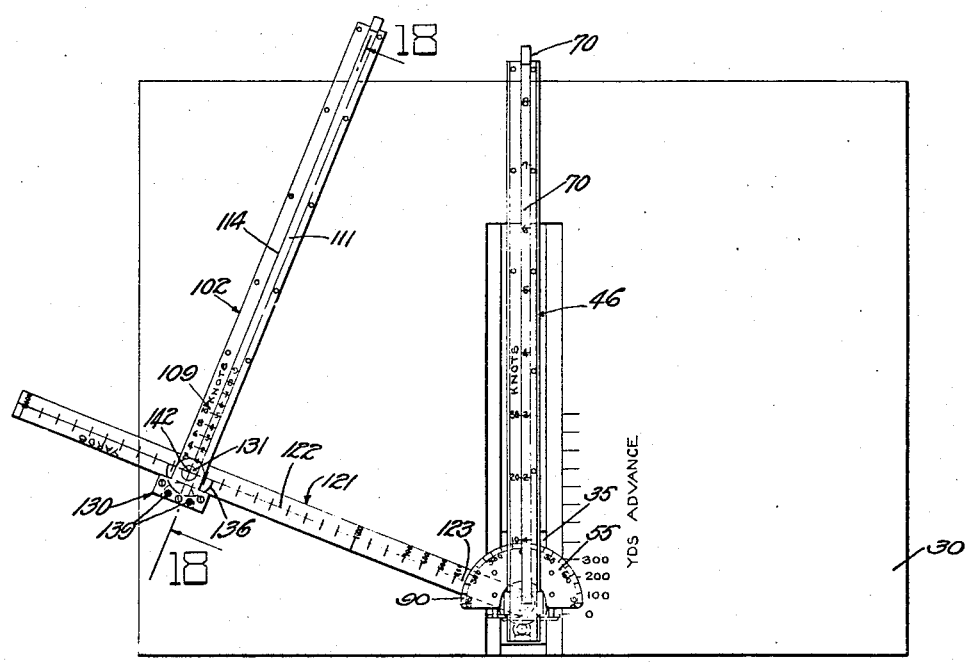
INVENTOR=
Franklin A. Reece
by Dike, Calver, Porter
Attys.

Patented Mar. 6, 1945

2,370,753

UNITED STATES PATENT OFFICE 2,370,753

COURSE INTERSECTION FINDER

Franklin A. Reece, Brookline, Mass.

Application November 19, 1943, Serial No. 510,866

9 Claims. (Cl. 33—98)

This invention relates to an instrument for forecasting the intersection of the courses of two moving objects in relative angle and elapsed-time from a starting moment (hereinafter referred to as "pick-up"), and more particularly for anticipating the meeting point of two vessels travelling at variable speeds and courses.

The invention (although capable of other uses) has for a primary object to provide an instrument whereby the navigator of a sub-chaser, destroyer, or the like, having located a submarine by the use of known submarine signalling or detecting devices, can so navigate his vessel that its course will intersect the course of the submarine at a point at which both vessels will arrive simultaneously (or approximately so) and at a known time at which a depth charge attack can be launched.

The invention will best be understood from the following description of the construction and mode of use of certain illustrative embodiments thereof shown in the accompanying drawings, these, however, having been chosen for purposes of exemplification merely, it being contemplated that the invention, as defined by the claims hereunto appended, may be otherwise embodied and used without departure from the spirit and scope thereof.

In said drawings:

Fig. 1 is a perspective view of the substantially complete instrument.

Figs. 2 and 3 are enlarged fragmentary perspective views, partly in section, of certain parts shown in Fig. 1.

Fig. 4 is a plan view.

Fig. 5 is a section taken substantially on the line 5—5, Fig. 4.

Figs. 6 and 7 are enlarged sections taken substantially on the lines 6—6 and 7—7, respectively, Fig. 5.

Fig. 8 is an enlarged detail section, partly broken out, likewise taken substantially on the line 5—5, Fig. 4, of the main (or "destroyer") arm.

Fig. 9 is a fragmentary section taken substantially on the line 9—9, Fig. 8.

Fig. 10 is an enlarged fragmentary plan view of the slide by which the "submarine" arm is adjustably carried by the "pick-up" arm.

Fig. 11 is a detail section taken substantially on the line 11—11, Fig. 10.

Fig. 12 is a detail section taken substantially on the line 12—12, Fig. 11.

Figs. 13, 14, 15 and 16 are plan views showing successive steps in the use of the instrument.

Fig. 17 is a plan view of a modified construction.

Fig. 18 is an enlarged section taken substantially on the line 18—18, Fig. 17.

Fig. 19 is a plan view of the parts shown in Fig. 18.

Fig. 20 is a fragmentary section taken substantially on the line 20—20, Fig. 19.

Referring to Figs. 1 to 7, 30 denotes a table or base board having in its upper surface an elongated recess 31 in a deepened central or axial portion 32 of which is secured, as by screws 33 (Figs. 1 and 5), a guide 34 on which is mounted a slide 35. As shown, the guide 34 is formed along its lateral edges with undercut ways 36 to receive inturned flanges 37 on the bottom of the slide 35. The flanges 37 may be formed integral with the slide or (preferably) on separate strips secured thereto. Secured, as by screws 40 (Figs. 2 and 3) to the rear face of the slide 35, is a plate or strip 41 the laterally extending ends of which (see Fig. 7) are received in the outer shallower portions of the recess 31 and serve as convenient finger pieces for moving said slide along the guide 34. Also pivotally mounted on the slide at the outer side of the plate 41 is an eccentric 38 (Fig. 7) having a finger piece 39 whereby said eccentric can be turned into cramping engagement with the upper face of the guide 34 to retain the slide in adjusted position on said guide. At one side of the recess 31 the table 30 is provided with a scale 42 graduated in distances, e. g., yards, for a purpose hereinafter explained.

The slide 35 represents the position of the subchaser, destroyer, or similar vessel, and its movement along the guide 34 the course or direction of movement of said vessel. Since such position and direction are merely relative to other positions and directions hereinafter referred to, the table 30 can be placed in any convenient position, there being no necessity of orienting the instrument with respect to the vessel. Pivotally and slidably mounted on the slide 35 is an arm 46 which may be conveniently designated the "destroyer" arm. As shown in Figs. 3, 5 and 6, a pivot stud 47 is rotatably mounted in a bushing 48 in the slide 35 and has a head 49 (see also Fig. 2) formed with undercut ways 50 in which the arm 46 is slidably received. Referring particularly to Figs. 4, 5, 8 and 9, the arm 46 has secured to its under side, adjacent its rear or inner end, a pair of spaced lugs 51 and 52 adapted to embrace a stud 53 projecting upwardly from the guide 34. The lug 52, which is formed with an arcuate face, carries a notched leaf spring 54 cooperating with the stud 53 to retain the lugs 51 and 52 releasably in engagement with said stud.

By this arrangement, the arm 46 is normally held against longitudinal movement when the slide 35 is moved along the guide 34 (the ways 50 merely sliding idly along said arm) but may be freely swung about the axis of the pivot 47, the lugs 51 and 52 being then disengaged from the stud 53. The angular adjustment of said arm about said axis may be indicated on a graduated protractor segment 55 secured to arms 56 extending forwardly from the plate 41. One of the ways 50 is preferably provided with a friction-spring 57 (Figs. 4, 6 and 7) which engages the edge of the arm 46 to resist longitudinal displacement of said arm when disconnected from the stud 53.

The arm 46 preferably comprises two superimposed strips 65 and 66 of transparent material, such as a suitable plastic. One of these strips has inscribed thereon a scale 67 graduated in speeds, e. g., knots. Also one of the strips, preferably the lower strip 66, is formed with a straight longitudinal groove providing between the strips a straight longitudinal channel 68 extending alongside the inner edge of the knot scale 67. The edge 64 of the channel 68 adjacent the scale 67 is coincident with the center line of the arm 46 which passes through the axis of the pivot 47 and may, therefore, be employed as an index mark to cooperate with the graduations on the protractor segment 55; see, for example, Fig. 4 in which the arm 46 is shown in the zero azimuth position. The term "azimuth" is herein used as meaning a horizontal arc measured clockwise from a zero point or base line representing the relative initial course of the destroyer, and not in the more restricted sense of an arc measured from the meridian, and should be read with this meaning in the present description. Said edge 64, if desired may be colored to make it more distinct. Within the channel 68, and anchored therein at its inner end, as indicated at 69 in Figs. 5, 8 and 9, is an extensible and contractible time scale 70 whose graduations (representing, for example, minutes and seconds) cooperate with the graduations of the speed scale 67 and also with an index mark 71 (Figs. 3 and 4) on the head or guideway 49. The scale 70 comprises a strip or band of elastic material, such as rubber or the like, so that the spacing of the graduations inscribed thereon varies with the extension or contraction of said band as a whole. The scale 70 is set (as and for purposes hereinafter further explained) in accordance with the speed of the vessel by stretching or drawing it out at its outer end until the graduation thereon representing one minute registers with the graduation of the scale 67 representing that speed, whereupon said scale or band is locked in set or adjusted position by a roll 72 (Fig. 8) which is located in a recess 73 near the end of the bottom of the channel 68 and which cooperates with a shoulder 74 to grip the band. To allow the band to contract, it is drawn out slightly further, lifted out of contact with the roll 72 and permitted to slide back into the channel 68.

Secured, as by bolts 79, to the table 30 is a bracket 80 (Figs. 1, 4, 5 and 7) having a portion 81 which spans the rear or inner end of the recess 31 and in an extension 82 of which is mounted a stud 83 in axial alinement with the zero point on the scale 70 when the lugs 51 and 52 engaged with the stud 53 and with the axis of the pivot 47 when the slide 35 is in its initial or "pick-up" position (shown in Figs. 1 and 14) as determined by engagement of the plate 41 with a flange or washer 84 (Figs. 1, 4, 5 and 7) on the stud 53. Pivoted at its inner end on the stud 83 is an arm 85 which may be conveniently designated the "pick-up" arm. The stud 83 is held against turning in the extension 82 by a set screw 86 (Fig. 5) and is provided at its lower end with a flange or head 87 and at its upper end with a nut 88 by which the arm 85 can be clamped or locked in adjusted angular position. The arm 85, which, like the arm 46, is composed of transparent material, is inscribed with a scale 89 graduated in distances, e. g., yards, and whose center line constitutes an index mark cooperating with a graduated protractor segment 90 to indicate the angular adjustment of said arm. The protractor segment 90 is mounted on the stud 83, is supported by the flange 87, is held against turning on said stud and flange by a pin 91 (Fig. 5) and is formed with an opening 92 to permit observation of the scale 70.

Referring to Figs. 1, 4, 5, 10 and 11, the arm 85 is formed with longitudinal ways 98 on which is guided a slide 99 carrying a friction spring 100 (Fig. 10) engaging the edge of the arm to steady the movement of the slide therealong and assist in holding the same temporarily in adjusted position. Journalled in the slide 99 is a hub 101 (see also Fig. 12) at the inner end of an arm 102 which may be conveniently designated the "submarine" arm. The hub 101 is received in a circular opening in the slide 99 and is retained therein by gibs 103 secured, as by screws 105, to said slide and received in a circumferential groove 104 in said hub. In threaded engagement with the hub 101, with its axis parallel to but at one side of the axis of said hub, is a clamp screw 106 having a finger piece 107 and between the end of which and the arm 85 is interposed a disk 108 (Fig. 12). Tightening the clamp screw 106 serves to fix the longitudinal position of the slide 99 on the arm 85 and also to fix the angular position of the hub 101 and arm 102 with respect to said slide. Like the arm 46, the arm 102 is composed of transparent material, is inscribed with a speed (knot) scale 109 similar to the scale 67, and is formed with a longitudinal channel 110 within which is an extensible and contractible time scale 111, similar to the time scale 70, anchored at its inner end, at 112 (Fig. 11), with its zero point substantially at the axis 115 of the hub 101, and adapted to be retained in stretched or extended position by a gripping roll 113 (Fig. 5) similar to the roll 72. The edge 114 (Fig. 10) of the channel 110 adjacent the knot scale 109 which is coincident with the center line of the arm 102 constitutes an index line which intersects the axis 115 of the hub 101 as does also the center or index line of the scale 89. At its center, coincident with the axis 115, the hub 101 is provided with an index dot 116.

Pivoted at its inner end in the bushing 48, between the slide 35 and a flange 120 (Fig. 6) on said bushing adjacent the head 49, is an arm 121 which may be conveniently designated the "plotting" arm, and which, as shown in Figs. 5 and 7, immediately overlies the table 30. The arm 121 is inscribed with a scale 122 graduated in distances, e. g., yards, corresponding to the graduations of the scale 89 on the arm 85. The inner end 123 (Figs. 1 and 4) of the center line of the scale 122 constitutes an index mark which cooperates with the graduations of the segment 55. Beyond the segment 55, said center line may take the form of a narrow slot 124 to receive the point of a pencil or other implement.

Successive steps in the use of the instrument are shown in Figs. 13 to 16. The lugs 51 and 52 of the "destroyer" arm 46 being engaged with the stud 53, and the slide 35 being in its innermost or "pick-up" position (Fig. 13) with the plate 41 against the flange 84, the extensible scale or band 70 is drawn out or adjusted, in accordance with the known speed of the destroyer, which in this instance is assumed to be 15 knots, to bring the one minute graduation thereon opposite the point on the knot scale 67 corresponding to that speed, and locked in that position of adjustment by the roll 72. Upon receipt of a "pick-up" signal, indicating the presence, direction or bearing (relative to the original or initial course of the destroyer) and distance of a submarine, the "pick-up" arm 85 is swung to bring its index line (i. e., the center line of the scale 89) into register with the graduation on the segment 90 corresponding to said direction or bearing, indicated in Fig. 13 as azimuth 312°, and the slide 99 is set on the arm 85 in a position in which the index dot 116 is at a point on the center line of the scale 89 corresponding to said distance, indicated in Fig. 13 as 1400 yards.

The course and speed of the destroyer remaining unchanged, the slide 35 is moved outwardly or forwardly on the guide 34, in anticipation of a second signal after a predetermined time interval, assumed in Fig. 14 as one minute and 20 seconds, to a position in which the index mark 71 on the head 49 is at a point on the scale 70 corresponding to that interval. At the expiration of said interval, a second signal indicates the (then) direction and distance of the submarine with respect to the (then) course and position of the destroyer. The "plotting" arm 121 is then swung to bring its index mark 123 into register with the graduation on the segment 55 corresponding to the second signal direction, assumed in Fig. 14 as azimuth 289°, and the "submarine" arm 102 swung on its pivot in the slide 99 until its index line 114 intersects the center line of the scale 122 at a point corresponding to the second signal distance, assumed in Fig. 14 as 1020 yards. The index line 114 of the arm 102 then represents the course of the submarine relative to the course of the destroyer as represented by the index line 64 of the arm 46, and the slide 99 and arm 102 may then be locked in adjusted position by the clamp screw 106.

The time scale or band 111 of the arm 102 is then drawn out or adjusted to bring the graduation thereof corresponding to the graduation of the scale 70 at which the slide 35 is set (in this instance, one minute and 20 seconds) at the point of intersection of the index line 114 with the center line of the scale 122. The one minute graduation on the scale 111 then indicates on the knot scale 109 the speed of the submarine: as shown in Fig. 14, about 3 knots.

Depending upon the distance of the submarine, the relative speeds, and the point where the attack should be made, the operations described in the two preceding paragraphs can, so far as practicable and to check the setting, be repeated in response to third, fourth, or subsequent signals. Suppose, however, that from the looks of the problem, as developed by the second signal, attack appears advisable at one minute and thirty seconds after the original pick-up. The slide 35 is moved forward to the one minute and 30 second mark on the scale 70 and an additional amount for the distance (yards) of advance incidental to the turn indicated at *a* in Fig. 15. By "advance" is meant the component or ordinate of the curve *a* in the direction of the original or initial course. The setting for this additional amount can conveniently be done by using the scale 42 in conjunction with the adjacent end or finger piece of the plate 41. In Fig. 15, the slide 35 is set for an attack at one minute and 30 seconds, plus an advance of 100 yards. If preferred, and the time required for the turn is known, the time scale 70 may be used for measuring the advance, the arm 46 being still in the position shown in Fig. 14. Since the approximate angle of the required turn is known from the previous setting of the arm 121 (Fig. 14), the advance incidental to the turn can be approximately determined from the known characteristic performance of the vessel.

The slide 35 being adjusted as above described, and as shown in Fig. 15, the arm 46 is turned about the axis of the pivot 47 (the lugs 51 and 52 being disengaged from the stud 53 to permit this) to intersect the arm 102 in such a position that the time graduations of the scales 70 and 111 at the point of intersection of the index lines 64 and 114 are of equal value, i. e., the same. The angle indicated on the scale of the protractor segment 55 by the index line 64 will then be the "collision" course, and the "collision" time will be that of the common time on the scales 70 and 111, that is to say, the course indicated on the segment 55 will be the course (relative to the initial course) which, if followed by the destroyer, will cause it to intercept or meet the submarine at the time (reckoned from the original pick-up time) represented by both scales 70 and 111 at the point of intersection of their index lines 64 and 114, assuming that the speed of the destroyer remains the same. If this speed is changed, the scale 70 should be readjusted correspondingly, as should also the angle of the arm 46 to maintain the equality of time reading at the point of intersection of the index lines 64 and 114 of the scales 70 and 111. The adjustment shown in Fig. 15 indicates that the destroyer, if proceeding at a speed of 15 knots on a course azimuth 289.2° will meet or intercept the submarine in three minutes, 25 seconds from the time of pick-up.

Although the protractor segments 55 and 90 are shown and above described as graduated in degrees azimuth from a zero point, representing the relative initial course of the destroyer, it may be more convenient to graduate them in degrees right and left of said zero point, in which case the setting of the "pick-up" arm 85 in Fig. 13 (corresponding to the bearing of the submarine at the time of pick-up) would be 48° L., that of the "plotting" arm 121 in Fig. 14 (corresponding to the bearing of the submarine at the second signal) 71° L., and that of the "destroyer" arm 46 in Fig. 15 (representing the "collision" course of the destroyer) 70.8° L.

A "lead" or time allowance for the dropping and sinking of the depth charge as well as for the travel of the destroyer between the position thereon of the signal apparatus and that of the depth charge must be provided for in order to secure accuracy of result. This necessary correction is applied by swinging the arm 46 into a position in which its index line 64 intersects the index line 114 of the arm 102 at a point on the scale 111 sufficiently in advance of that of the original or "collision" setting (Fig. 15) to correspond to this "lead" or time allowance, whereupon the angle indicated by the index line 64 on the segment 55 will give the corrected course of the destroyer, and the point of intersection of the index line 114 with the index line 64 will indicate on the scale 70 the corrected time (from the time of pick-up) at which the depth charge should be dropped. As shown in Fig. 16, it is assumed that an allowance of 30 seconds is required for dropping and sinking, and an additional allowance of 5 seconds for the destroyer length: a total of 35 seconds. The arm 46 has therefore been moved outwardly on the scale 111 the distance of 35 seconds which causes the index line 64 to intersect the index line 114 at the 4 minutes (3 minutes, 25 seconds plus 35 seconds) point on the scale 111, so that the true or corrected course of the destroyer is shown on the segment 55 to be azimuth 291.6° (68.4° L.), and the corrected time (from the time of pick-up) for dropping the depth charge is shown on the scale 70 as 3 minutes, 23 seconds.

A modification of the construction above described is shown in Figs. 17 to 20. In this, the "pick-up" arm 85 is omitted, and the "submarine" arm 102 is pivotally connected to a bracket 130 adapted to be directly and temporarily secured in suitable positions to the base or table 30. The bracket 130, like the arm 102 as above described, is composed of transparent material, as is also the pivotal mounting which, as shown, comprises a disk 131 carried by the inner end of the arm 102 and rotatably mounted in an extension 132 of a top plate 133 constituting a portion of the bracket 130 and secured to the base portion 134 thereof, as by screws 135. The inner end of the arm 102 is formed with a segmental extension 136, concentric with the axis 142 of the pivot 131, which is guided in a complementary arcuate groove 137 in the base portion 134 of the bracket. The bracket 130 may be secured in suitable position to the table 30 by means of slidably mounted spurs 138 which may be projected into the table by manually operated plungers 139, coiled springs 140 (Fig. 20) being preferably provided beneath the heads 141 of said spurs to hold them retracted when not in use. The inner end of the extensible scale 111 is anchored in the channel in the arm 102 with the zero point on said scale coincident with the axis 142 of the pivot 131.

In the use of this form of the invention, the slide 35 being in the "pick-up" position and the scale 70 having been adjusted to the speed of the destroyer, upon receipt of a "pick-up" signal the arm 121 is swung into the angular position (indicated by its index mark 123 on the segment 55) corresponding to the direction of the submarine, and the bracket 130 is secured to the table 30 in such position that the axis 142 of the pivot 131 intersects the center line of the scale 122 at a point corresponding to the distance of the submarine. The subsequent operations and adjustments are substantially identical with those above explained in connection with the form of the invention first described.

The slot 124 (Figs. 1 and 4), with which the arm 121, in both forms of the invention, may be provided, is for plotting submarine positions on the top of the table 30 with a pencil to establish the general relative course of the submarine before using the arm 102, or to quickly plot intermediate signals for checking purposes.

I claim:

1. An instrument for determining the course, relative to an initial course, to be followed by one object to cause it to intercept a second object, comprising, in combination, an arm having a time scale adjustable in accordance with the speed of travel of said first named object, a pivot for said arm movable in a direction representing the direction of said initial course, a second arm, a pivot for said second arm, and means for locating said last named pivot in accordance with one position of said second object, said second arm having a time scale adjustable in accordance with a subsequent position of said second object after a known time interval.

2. An instrument for determining the course, relative to an initial course, to be followed by one vessel to cause it to intercept a second vessel moving in a relatively different course, as well as the position and time of such interception, comprising, in combination, an arm having a time scale adjustable in accordance with the speed of travel of said first named vessel, a pivot for said arm movable in a direction representing the direction of said initial course, a second arm, a pivot for said second arm, and means for locating said last named pivot in accordance with one position of said second vessel, said second arm having a time scale adjustable in accordance with a subsequent position of said second vessel after a known time interval, and said first named arm being adjustable on its pivot to cause said time scales to intersect one another at graduations of equal value.

3. An instrument for determining the course, relative to an initial course, to be followed by one object to cause it to intercept a second object moving in a relatively different course, comprising, in combination, an arm having a time scale adjustable in accordance with the speed of travel of said first named object, a pivot for said arm movable in a direction representing the direction of said initial course, a second pivoted arm angularly adjustable in accordance with the direction of one position of said second object and having a distance scale, a third arm, a pivot for said third arm adapted to be located by said second arm in accordance with the direction and distance of said position, said third arm having a time scale adjustable in accordance with a subsequent position of said second object after a known time interval, and being adjustable on its pivot to locate the graduation of its time scale corresponding to said interval at a point corresponding to said subsequent position.

4. An instrument for determining the course, relative to an initial course, to be followed by one object to cause it to intercept a second object moving in a relatively different course, comprising, in combination, an arm having a time scale adjustable in accordance with the speed of travel of said first named object, a pivot for said arm movable in a direction representing the direction of said initial course, a second pivoted arm angularly adjustable in accordance with the direction of one position of said second object and having a distance scale, a third arm, a pivot for said third arm, a slide by which said last named pivot is carried, said slide being guided by said second arm and being adapted to be positioned thereon in accordance with the distance of said position, said third arm having a time scale adjustable in accordance with a subsequent position of said second object after a known time interval, and being adjustable on its pivot to locate the graduation of its time scale corresponding to said interval at a point corresponding to said subsequent position.

5. An instrument for predicting the point of interception of vessels moving on different courses including, in combination, a table, a destroyer arm having means to indicate an elapsed time, a pivot for the destroyer arm slidable on a line along the table representing the course of the destroyer, a submarine arm also having means to indicate an elapsed time, a pivot for said submarine arm movable along a line from the initial position of the destroyer arm pivot and at an angle to the initial course of the destroyer corresponding to the bearing of the submarine, said submarine arm being capable of being swung about its pivot to an angular position corresponding to the course of the submarine and the destroyer arm being capable of being swung about its pivot to bring a point corresponding to an elapsed time into coincidence with the point on the submarine arm corresponding to the same time.

6. An instrument for predicting the point of interception of vessels moving on different courses including, in combination, a table, a destroyer arm having means to indicate an elapsed time, a pivot for the destroyer arm slidable on a line along the table representing the course of the destroyer, a submarine arm also having means to indicate an elapsed time, a pivot for said submarine arm movable along a line from the initial position of the destroyer arm pivot and at an angle to said course corresponding to the bearing of the submarine, a third arm pivoted for angular adjustment into a position corresponding to said bearing and graduated in distances to position the submarine arm pivot on said last named line, said submarine arm being capable of being swung about its pivot to an angular position corresponding to the relative course of the submarine, and the destroyer arm being capable of being swung about its pivot to bring a point corresponding to an elapsed time into coincidence with the point on the submarine arm corresponding to the same time.

7. An instrument for predicting the point of interception of vessels moving on different courses, including, in combination, a table, a destroyer arm having graduations to indicate elapsed time, a pivot for the destroyer arm slidable along the table on a line representing the course of the destroyer, a submarine arm also having graduations to indicate elapsed time, a pivot for said submarine arm movable along a line from the initial position of the destroyer arm pivot and at an angle to the initial course of the destroyer corresponding to a first bearing of the submarine to a position corresponding to the distance of the submarine, and a plotting arm pivoted co-axially with the destroyer arm and graduated in distances, said plotting arm being movable on its pivot into an angular position corresponding to a second bearing of the submarine, said submarine arm being capable of being swung about its pivot to an angular position in which it intercepts the plotting arm at a point corresponding to the distance of the second bearing, and the destroyer arm being capable of being swung about its pivot to intersect the submarine arm at such a position that the time graduations at the point of intersection are the same.

8. An apparatus for forecasting the course which must be followed by one moving object in order to intercept another moving object, said apparatus including, in combination, an arm graduated in units of speed and having an adjustable scale graduated in units of time, a slide carrying a pivot for said arm movable with respect to said arm, a second arm having an adjustable scale graduated in units of time, a pivot for said second arm, means for locating said last named pivot in accordance with the direction and distance of one position of the second object with respect to the course and position of the first object, and a third arm graduated in distances and pivoted coaxially with said first named arm, said second arm being adjustable about its pivot to locate a subsequent position of the second object by intersection with the third arm and adjustment of the time scale of the second arm to cause its graduation at the point of intersection to correspond with the graduation of the time scale of the first named arm at the axis of the first named pivot, whereby said first named arm can be swung upon its pivot to intersect said second arm at a point where the graduations of the two time scales are the same, and thereby indicate the interception course by the position of said first named arm.

9. An apparatus for forecasting the course which must be followed by one moving object in order to intercept another moving object, said apparatus including, in combination, an arm graduated in units of speed and having an adjustable scale graduated in units of time, a slide carrying a pivot for said arm movable with respect to said arm, a second arm having an adjustable scale graduated in units of time, a pivot for said second arm, and means for locating said last named pivot in accordance with the direction and distance of one position of the second object with respect to the course and position of the first object, said last named means including a third arm graduated in distances and pivoted coaxially with said first named arm, said second arm being adjustable about its pivot to locate a subsequent position of the second object by intersection with the third arm and adjustment of the time scale of the second arm to cause its graduation at the point of intersection to correspond with the graduation of the time scale of the first named arm at the axis of the first named pivot, whereby said first named arm can be swung upon its pivot to intersect said second arm at a point where the graduations of the two time scales are the same, and thereby indicate the interception course by the position of said first named arm.

FRANKLIN A. REECE.